United States Patent
Nemoto et al.

[11] Patent Number: 5,870,504
[45] Date of Patent: Feb. 9, 1999

[54] HIGH SPEED OUTLINE SMOOTHING METHOD AND APPARATUS INCLUDING THE OPERATION OF SHIFTING BITS OF THE CURRENT, PRECEDING, AND SUCCEEDING LINES LEFT AND RIGHT

[75] Inventors: Naoyuki Nemoto, Yamato; Hiroyasu Takahashi, Yokohama, both of Japan

[73] Assignee: International Business Machines Corporation, Armonk, N.Y.

[21] Appl. No.: 779,183

[22] Filed: Jan. 6, 1997

[30] Foreign Application Priority Data

Feb. 29, 1996 [JP] Japan ................... 8-042302

[51] Int. Cl.⁶ .................. G06K 9/44; G06T 5/00
[52] U.S. Cl. ........................... 382/266; 382/269
[58] Field of Search ................... 382/266, 267, 382/269, 205, 254, 264; 358/447, 448

[56] References Cited
U.S. PATENT DOCUMENTS 5,404,233  4/1995  Nagata et al. ................... 382/269
5,649,034  7/1997  Sonobe ........................... 382/269

Primary Examiner—Scott Rogers
Attorney, Agent, or Firm—Daniel E. McConnell; Martin J. McKinley

[57] ABSTRACT

OCR processing involves: acquisition of images from image capturing devices; determination of location/size/style for each character; normalization; smoothing for large corners; smoothing by the deletion of individual protruding and extraneous dots; extraction of features; pattern matching; automatic error correction using a word dictionary; and output of recognition results.

In the present invention, high speed software processes accomplish smoothing large corners and deletion of individual protruding and extraneous dots. In this software processing, the smoothing process is performed by shifting bit rows and using only the logical operators NOT, AND, and OR; not used are the often employed conventional conditional branch commands, such as the "if then else" and "switch" statements. This smoothing method (using only NOT, AND, and OR) contributes to a substantial reduction in the processing speed.

8 Claims, 9 Drawing Sheets

| upper line shift left<br>uℓ - up >> 1<br>0 0 0 0 0 0 0 0 | up | upper line shift right<br>ur - up << 1<br>0 0 0 0 0 0 0 0 |
|---|---|---|
| current line shift left<br>cℓ - ct >> 1<br>0 0 1 1 1 1 0 0 | ct | current line shift right<br>cr - ct << 1<br>1 1 1 1 0 0 0 0 |
| lower line shift left<br>dℓ - dw >> 1<br>0 0 1 1 1 1 0 1 | dw | lower line shift right<br>dr - dw << 1<br>1 1 1 1 0 1 0 0 |

| uℓ | up | ur |
| cℓ | ct | cr |
| dℓ | dw | dr |

| line | bit pattern | |
|---|---|---|
| i - 1 | 0 0 0 0 0 0 0 0 | → upper line    up - 00000000 |
| i | 0 1 1 1 1 0 0 0 | → current line  ct - 01111000 |
| i + 1 | 0 1 1 1 1 0 1 0 | → lower line    dw - 01111010 |
|  | 0 0 0 1 1 0 0 0 | | a       b

FIG. 1

| upper line shift left<br>uℓ - up >> 1<br>0 0 0 0 0 0 0 0 | up | upper line shift right<br>ur - up << 1<br>0 0 0 0 0 0 0 0 |
|---|---|---|
| current line shift left<br>cℓ - ct >> 1<br>0 0 1 1 1 1 0 0 | ct | current line shift right<br>cr - ct << 1<br>1 1 1 1 0 0 0 0 |
| lower line shift left<br>dℓ - dw >> 1<br>0 0 1 1 1 1 0 1 | dw | lower line shift right<br>dr - dw << 1<br>1 1 1 1 0 1 0 0 |

| uℓ | up | ur |
|---|---|---|
| cℓ | ct | cr |
| dℓ | dw | dr |

FIG. 2 proceed from left
pattern to right pattern

| NOT uℓ | 1 1 1 1 1 1 1 1 |
|---|---|
| NOT up | 1 1 1 1 1 1 1 1 |
| ur | 0 0 0 0 0 0 0 0 |
| NOT cℓ | 1 1 0 0 0 0 1 1 |
| cr | 1 1 1 1 0 0 0 0 |
| dℓ | 0 0 1 1 1 1 0 1 |
| dw | 0 1 1 1 1 0 1 0 |
| dr | 1 1 1 1 0 1 0 0 |
| logical OR | 1 1 1 1 1 1 1 1 |
| ct | 0 1 1 1 1 0 0 0 |
| Result | 0 1 1 1 1 0 0 0 | no change

FIG. 3 proceed from left
pattern to right pattern

| | |
|---:|:---|
| uℓ | 0 0 0 0 0 0 0 |
| up | 0 0 0 0 0 0 0 |
| ur | 0 0 0 0 0 0 0 |
| NOT cℓ | 1 1 0 0 0 1 1 |
| cr | 1 1 1 1 0 0 0 |
| NOT dℓ | 1 1 0 0 0 1 0 |
| NOT dw | 1 0 0 0 0 1 0 1 |
| dr | 1 1 1 1 0 1 0 0 |
| logical OR | 1 1 1 1 0 1 1 1 |
| ct | 0 1 1 1 1 0 0 0 |
| Result | 0 1 1 1 0 0 0 0 |

} AND remove point b
(Fig.1) by smoothing

FIG. 4 proceed from left pattern to right pattern

| | |
|---:|:---|
| uℓ | 0 0 0 0 0 0 0 0 |
| NOT up | 1 1 1 1 1 1 1 1 |
| NOT ur | 1 1 1 1 1 1 1 1 |
| cℓ | 0 0 1 1 1 1 0 0 |
| NOT cr | 0 0 0 0 1 1 1 1 |
| dℓ | 0 0 1 1 1 1 0 1 |
| dw | 0 1 1 1 1 0 1 0 |
| dr | 1 1 1 1 0 1 0 0 |
| logical OR | 1 1 1 1 1 1 1 1 |
| ct | 0 1 1 1 0 0 0 0 |
| Result | 0 1 1 1 0 0 0 0 |

AND (no change)

FIG. 5 proceed from left
pattern to right pattern

| | |
|---:|:---|
| uℓ | 0 0 0 0 0 0 0 0 |
| up | 0 0 0 0 0 0 0 0 |
| ur | 0 0 0 0 0 0 0 0 |
| cℓ | 0 0 1 1 1 1 0 0 |
| NOT cr | 0 0 0 0 1 1 1 1 |
| dℓ | 0 0 1 1 1 1 0 1 |
| NOT dw | 1 0 0 0 0 1 0 1 |
| NOT dr | 0 0 0 0 1 0 1 1 |
| logical OR | 1 0 1 1 1 1 1 1 |
| ct | 0 1 1 1 1 0 0 0 |
| Result | 0 0 1 1 1 0 0 0 | remove point a
(Fig.1) by smoothing

16 X 24 PATTERN BEFORE PROCESS

FIG. 9

16 X 24 PATTERN AFTER SMOOTHING OF CORNERS
(REMOVAL OF CORNERS)

FIG. 10

16 X 24 PATTERN BEFORE PROCESS

FIG.11

16 X 24 PATTERN AFTER SMOOTHING OF CORNERS
BY DELETING PROTRUDING AND EXTRANEOUS DOTS

FIG. 12

HIGH SPEED OUTLINE SMOOTHING METHOD AND APPARATUS INCLUDING THE OPERATION OF SHIFTING BITS OF THE CURRENT, PRECEDING, AND SUCCEEDING LINES LEFT AND RIGHT

BACKGROUND OF THE INVENTION

The present invention relates to a processing method for OCR (Optical Character Recognition) and image enhancement, and in particular, to a software smoothing method.

A special hardware device is conventionally employed for the performance of OCR related processes. An example is an MCA (Micro Channel Architecture) option card, having a 68020 or a 68040 Motorola (TM) processor and associated memory which is employed to perform an image process, a smoothing process, and a pattern matching process.

At present, high speed CPUs are widely available at low prices, and OCR related processes can be performed using software only; special hardware is not required for such tasks. The merits of using software for OCR operations are that only a relatively small investment is required, and OCR functions can be easily and flexibly altered by the employment of new versions of software.

If only software is used to perform processes that have heretofore been hardware functions, there is a general reduction in processing speed accompanied by a drastic reduction in cost performance. If measures are taken to forcibly increase speed, they may be accompanied by a drop in the character recognition rate, the basic function originally demanded of OCR operations, and the occurrence of other problems. For example, a character to be scanned may be so small that a large corner appears when the size is normalized, and a correct outline can not be extracted when noise carried by one dot reflects in the vertical and horizontal directions.

It is very important in such cases that smoothing be performed in order to avoid the possibility that the character recognition rate will be reduced.

SUMMARY OF THE INVENTION

It therefore is one purpose of the present invention to provide a method by which, for an OCR process that uses software, speed for smoothing figure outlines (mainly characters for an OCR process) is increased until it is so high that it can almost be disregarded during the entire process.

It is another purpose of the present invention to maintain a character recognition rate equal to or greater than that which is obtained by a process that uses hardware.

It is an additional, more specific purpose of the present invention to perform high speed smoothing of figures (which correspond to normalized patterns in an OCR process) drawn in a bit pattern.

BRIEF DESCRIPTION OF THE DRAWINGS

Some of the purposes of the invention having been stated, others will appear as the description proceeds, when taken in connection with the accompanying drawings, in which.

DESCRIPTION OF THE PREFERRED EMBODIMENT(S)

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Generally, OCR processing involves the following processing steps:
1. (start) Acquisition of images from image capturing devices
2. (preprocessing) Determination of location/size/style for each character
3. Normalization
4. Smoothing for large corners (when resolution is low)
5. Smoothing by the deletion of individual protruding and extraneous dots
6. Extraction of features
7. Pattern matching
8. (postprocessing) Automatic error correction using a word dictionary
9. Output of recognition results The purposes of this invention are achieved by providing high speed software for processes 4 and 5. In this software processing, the smoothing process is performed by shifting bit rows and using only the logical operators NOT, AND, and OR. The frequently employed conventional conditional branch commands, such as the "if then else" and "switch" statements are avoided. This method (using only NOT, AND, and OR) contributes to a substantial reduction in the processing speed.

The present invention contemplates two methods for high speed smoothing:
(1) Smoothing of large corners (removal of corners)
(2) Smoothing by the deletion of individual protruding and extraneous dot.

In this disclosure, a smoothing method will be described for a figure drawn in a bit pattern that is eight bits wide and n lines high. In the same manner, this method can also be employed for the lines of 16/32/64 bits. Further, by setting a different mask pattern, this method can be flexibly changed, so that it can be used for processing a different pattern for each bit.

Corner smoothing (corner removal) is performed by deleting one dot of a corner when a pattern that is three bits wide and three bits high matches one of the four following mask patterns, A, B, C or D. For this process, it is important that a dot at a corner is deleted automatically and at high speed only by using a logical operation, without performing the conventional pattern matching in consonance with conditional branches that are frequently employed.

```
         A                              B
  *  *   .       *  *   .     .  .  .     .  .  .
  *  *   .  →    *  .   .     .  *  *  →  .  *  .
  .  .   .       .  .   .     .  *  *     .  *  *
         C                              D
  .  *   *       .  *  *      .  .  .     .  .  .
  .  *   *   →   .  .  *      *  *  .  →  .  *  .
  .  .   .       .  .  .      *  *  .     *  *  .
``` an asterisk indicates a blank point (= 1)
a period indicates a blank point (= 0)

Figure 1:
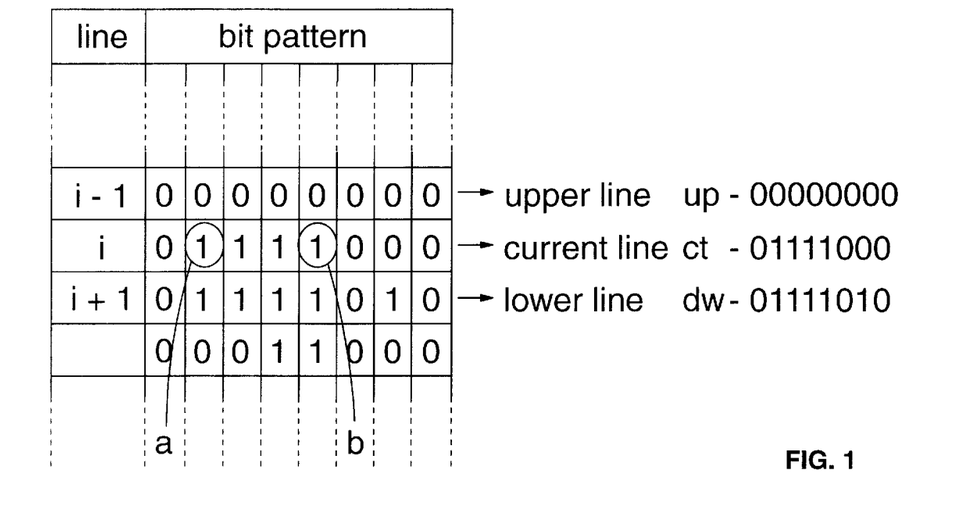
FIG. 1 is a diagram showing the correspondence of a bit pattern represented by binary values and the current line.

To achieve the above smoothing, the processing for a pattern that is eight bits wide will be explained as a specific example. In FIG. 1 is shown a bit pattern (normalized pattern) represented by binary values (1 or 0). A "0" indicates the absence of a dot and a "1" indicates the presence of a dot in a figure and a character drawn in a bit pattern. The processing is performed by units of one line in the horizontal direction (one line=eight bits). A line that serves as the center for current processing is called a current line, and is represented by ct, while a line above it is represented by up and a line below it is represented by dw. The positions labeled a and b represent dots to be deleted as the result of the following smoothing process.

Figure 2:
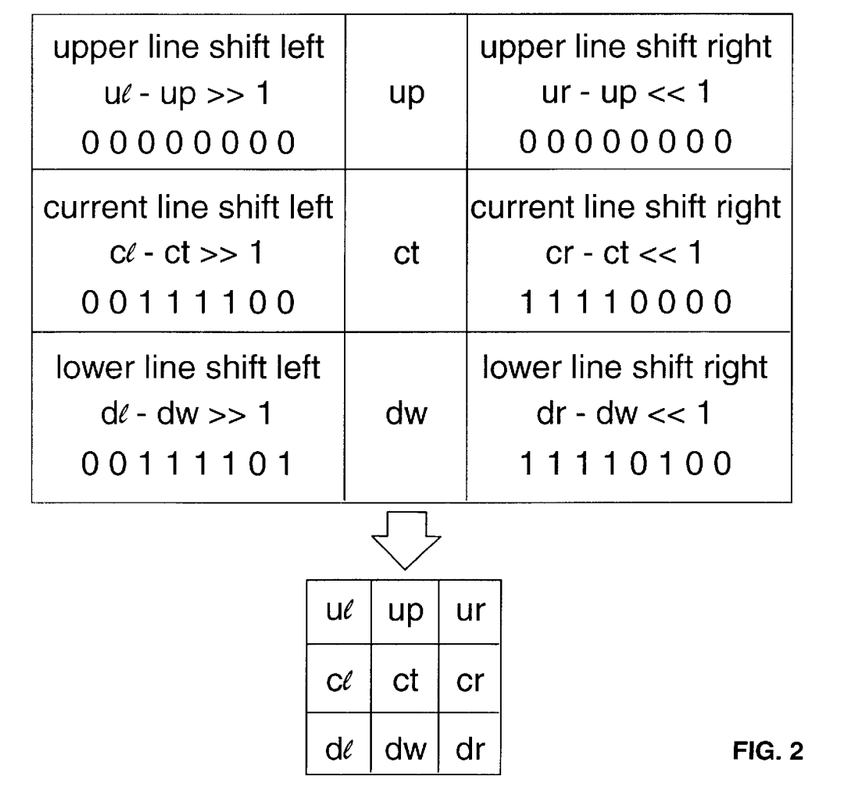
FIG. 2 is a diagram showing lines obtained by shifting the current line and its preceding and succeeding lines.

In FIG. 2 are defined bit rows derived from these three lines. That is, the bit rows ul, ur, cl, cr, dl and dr. The letters "l" and "r", the suffixes for the line names, stand for the words "left" and "right", respectively; with, for example, cl meaning the current line is shifted to the left one bit. A "shift to the left" is defined as a shift in the direction that is contrary to that from the viewpoint of an operator, i.e., from the viewpoint of a sensor. Therefore, the bit rows in memory are shifted in the opposite direction, to the right, one bit. The left most bit that comes from outside of the bit pattern becomes "0". The nine rows with 8 bits are stored in a work variable area in memory and are targets for the following operation.

Figure 3:
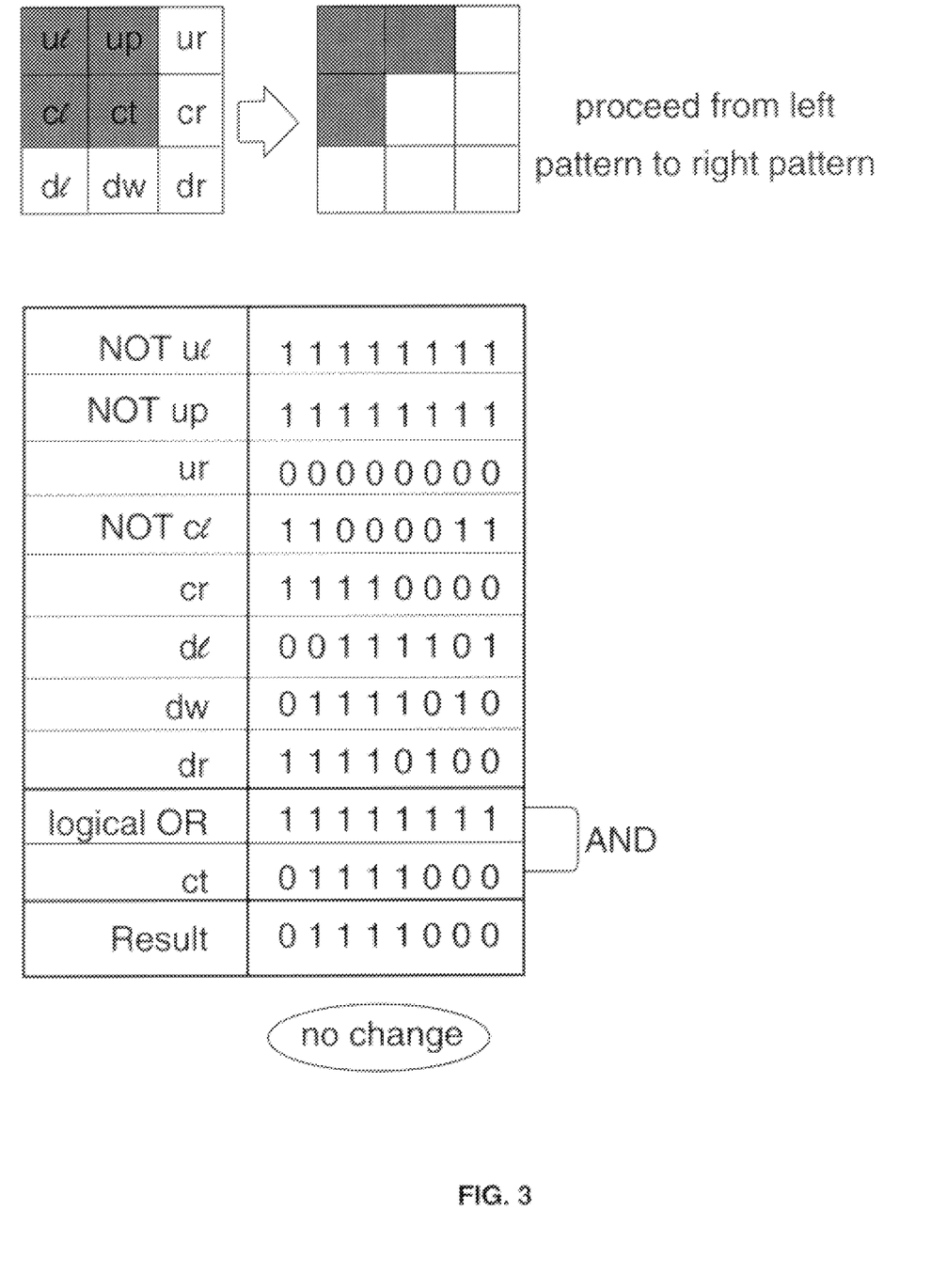
FIG. 3 is a diagram showing a smoothing method for pattern A.

FIGS. 3 through 6 are diagrams showing the actual smoothing method for the A through D patterns. In FIG. 3 is shown the smoothing process for pattern A. Nine blocks are located at the same positions as those for the work variables after the shift scanning in FIG. 2 is performed. More specifically, lines, which are obtained by shifting the current line and the lines above and below to the left and the right one bit, are logically positioned at the same column as that of the target dot, so that the smoothing process, which is performed by only logical operations, can easily be understood.

Since in the pattern A four bits at the upper left corner are black points (the presence of dots), the bits in rows ul, up and cl that correspond to the black points in lines other than the current line are inverted (correspond to the black points). The bit rows ur, cr, dl, dw and dr that correspond to the other blank areas are maintained unchanged (corresponding to blanks). Then, these eight work variables are ORed together. By means of this OR operation, a bit position in the current line that corresponds to a large corner is obtained as a "0". If the logical OR of all the bits, which is obtained by shifting the lines above and below one bit and by inverting black points, is "0", this indicates that it is a corner. When the result obtained by the OR operation and the bit row of the current line are ANDed (by using it as a bit mask to be employed for the current line) the smoothing process for the current line is terminated. Since in the example in FIG. 3, all the OR results are "1", it is understood that there are no target corner for smoothing. When this process is performed for all the lines, the smoothing for pattern A is terminated.

Figure 4:
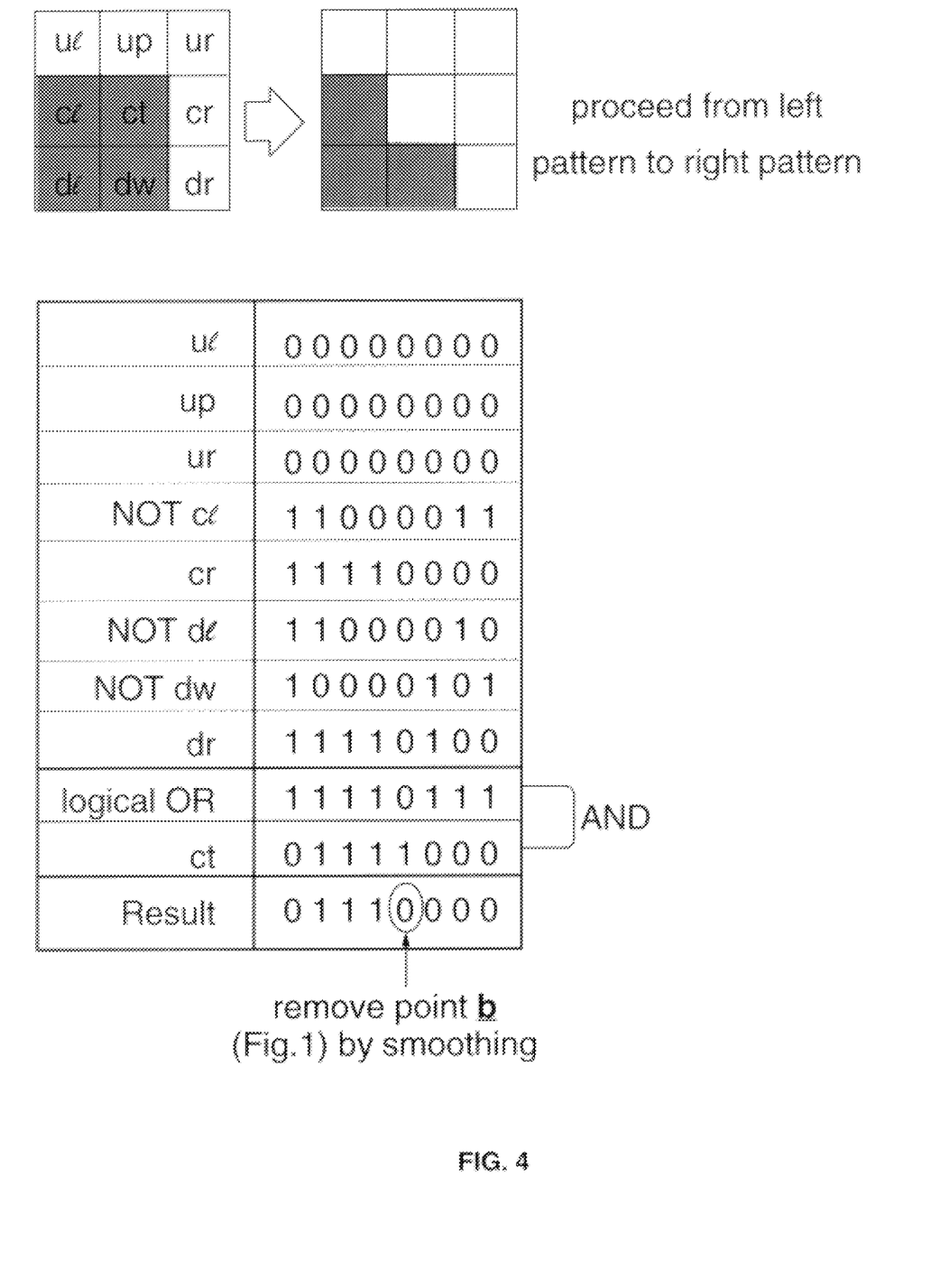
FIG. 4 is a diagram showing a smoothing method for pattern B.

In FIG. 4 is shown an example where four bits at the lower left corner are black points. The same operation is performed as for the example in FIG. 3. As a result of the OR operation, the fifth bit is 0, and thus it is understood that the fifth bit in the current line corresponds to a corner. The fifth bit, i.e., point b in FIG. 1, is deleted.

Figure 5:
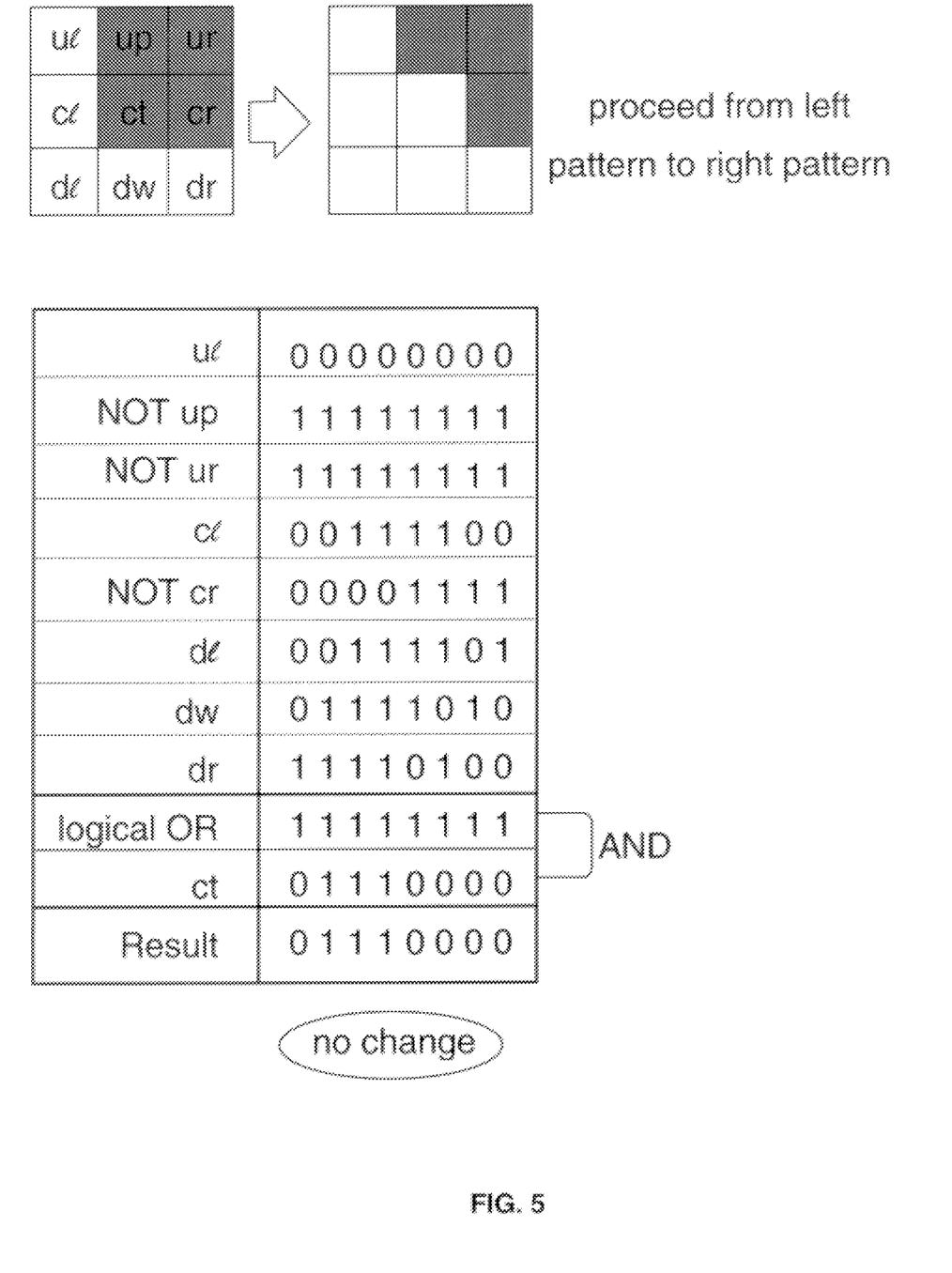
FIG. 5 is a diagram showing a smoothing method for pattern C.
Figure 6:
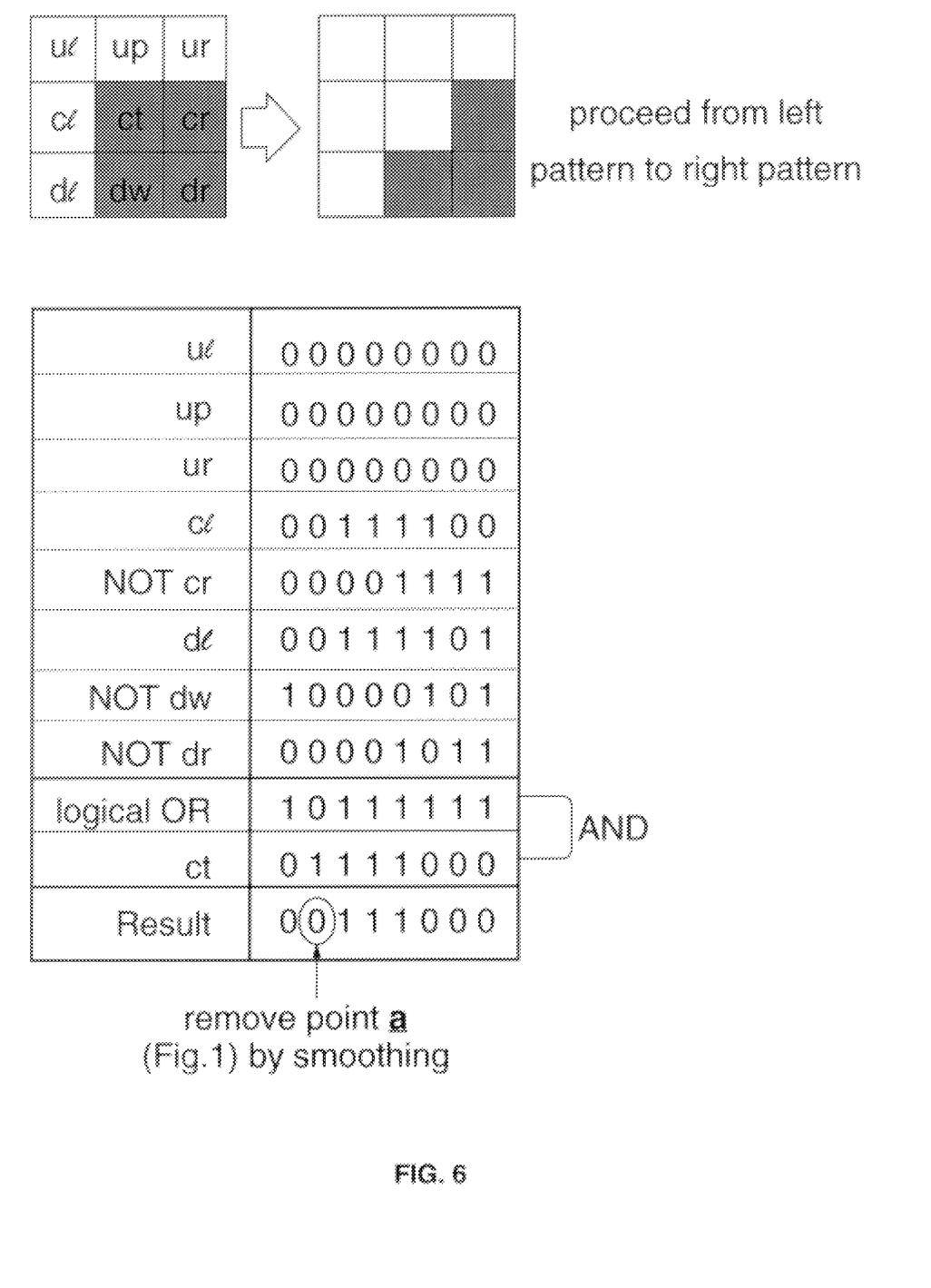
FIG. 6 is a diagram showing a smoothing method for pattern D.

In the same manner, the processing for patterns C and D in FIG. 5 and 6 are performed. Since as a result of the OR operation in the FIG. 6 the second bit is 0, point a in FIG. 1 is deleted by the smoothing process.

Figure 7:
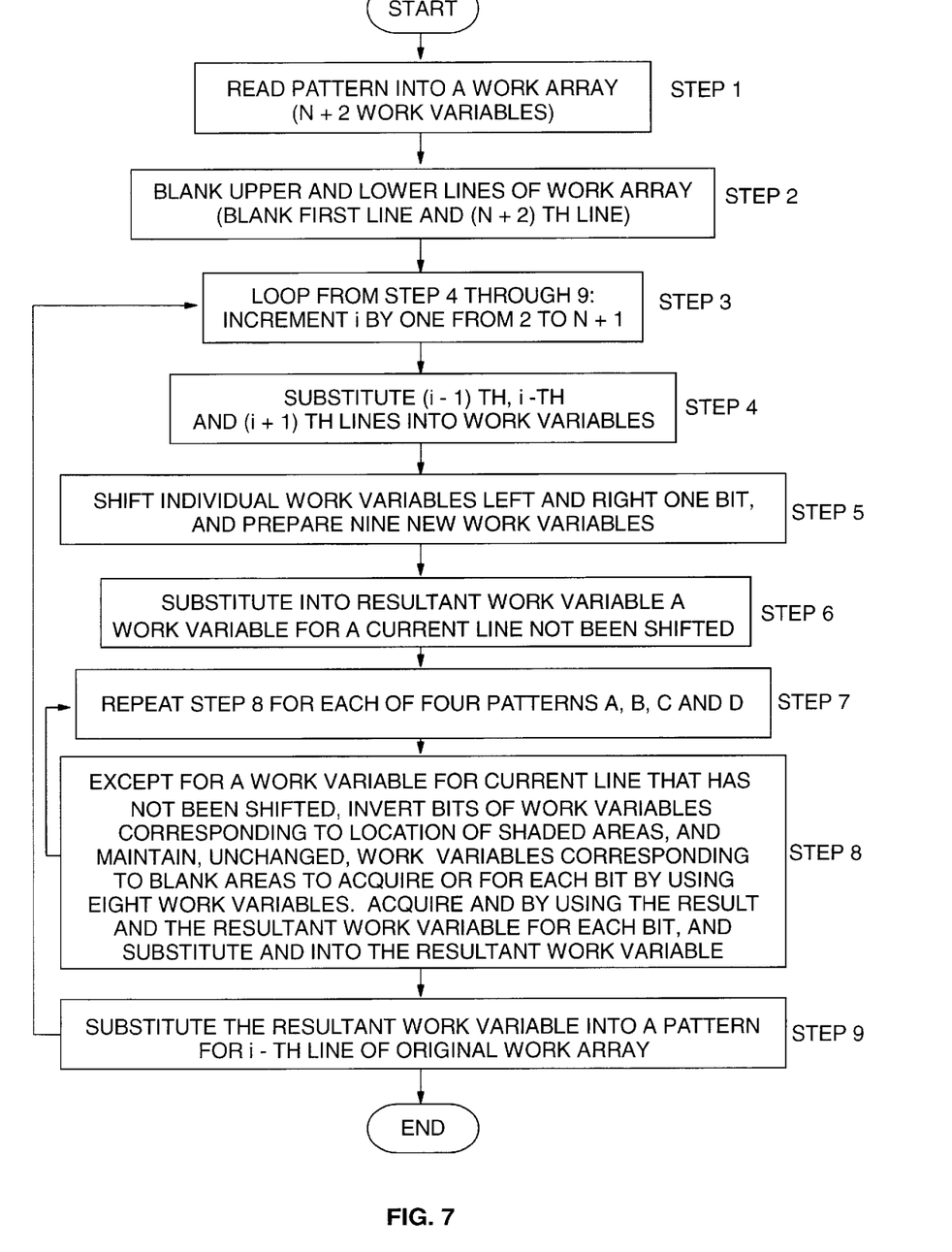
FIG. 7 is a flowchart showing a smoothing process for corners.

FIG. 7 is a flowchart of the process for smoothing a corner. At step 1, a bit pattern is read into a work array (line variable area). When the total number of lines in the bit pattern are defined as n, the work array contains n+2 lines, as it has an extra line at the top and at the bottom. Therefore, the bit pattern is read and stored into the second line of the work array. At step 2, the line at the top and at the bottom are blanked out. At step 3, a loop variable I is incremented by one from 2 to n +1 as the processing at step 4 through step 9 is repeated. At step 4, the line (l−1), which precedes the l-th line of the work array, the current line (I) and the succeeding line (l+1) are substituted into the work variables. At step 5, the work variables are shifted one bit to the right and to the left and are substituted into different work variables. Therefore, nine work variables are provided. At step 6, work variable for the current line that is not shifted is substituted into the resultant work variable.

At step 7, the following process at step 8 is repeated for each pattern, A, B, C or D. At step 8, except for the work variable of the current line that is not shifted, the work variables that correspond to the locations of blanks are maintained unchanged, the work variables that correspond to the positions of black points, are reversed. The obtained eight work variables are employed to acquire the total OR result for each bit. Then, an AND operation is performed for each bit of the OR result and the above described resultant work variable (current line without shift), and the results are substituted into the resultant work variables.

Finally, at step 9, the obtained final work variable is substituted into the pattern of the l-th line in the work array. The process for smoothing a corner is thereafter terminated.

A specific example that is written in C and is based on the flowchart in FIG. 7 will now be given for reference.

```
void Smooth 24(
unsigned short *buf16x24 /* pointer to a pattern to be
smoothed */) {
static unsigned short wkbuf[26]; /* work array */
short       I;
unsigned short ct;    /* center work variable 1 */
unsigned short cl;    /* c. left work variable 2 */
unsigned short cr;    /* c. right work variable 3 */
unsigned short up;    /* up     work variable 4 */
unsigned short ul;    /* u. left work variable 5 */
```

-continued

```
unsigned short ur;    /* u. right work variable 6 */
unsigned short dw;    /* down   work variable 7 */
unsigned short dl;    /* d. left work variable 8 */
unsigned short dr;    /* d. right work variable 9 */
unsigned short wk3;   /* resultant work variable */
/* 1. Shift a w-bit wide n-bit high pattern */
/*    one line and copy it to a work array  */
/*    (w (n+2) lines). */
for (I = 1; I < 25; I ++) {
        wkbuf[i] = *(buf16x24 + I-1);
}
/* 2. Blank out the top and bottom lines */
/*    of a pattern in a work array */
wkbuf[0] = 0;
wkbuf[25] = 0;
/* 3. Loop through steps 4-9 from second line */
/*    to the n+1-th line */
for (I = 1; I < 25; I ++) {
    /* 4. Substitute (I-1)th, I-th, and (I+1)th */
    /*    lines in the work array into work */
    /*    variables. */
        ct = wkbuf[i];
        up = wkbuf[i-1];
        dw = wkbuf[i+1];
/* 5. Shift work variables to the right and to the left */
/*    one bit and substitute them into different */
/*    work variables. Produce nine work variables. */
        cl = ct >> 1;
        cr = ct << 1;
        ul = up >> 1;
        ur = up << 1;
        dl = dw >> 1;
        dr = dw << 1;
/* 6. Substitute work variables for a current line not */
/*    shifted into resultant work variables. */
        wk3 = ct;
/* 7. Repeat 8 for each of four patterns. */
/* 8. Except for the work variables of the current line */
/*    not shifted, maintain, unchanged, the work */
/*    variables corresponding to the locations of Blank */
/*    Dots in the above diagram, invert bits of the * /
/*    work variables corresponding to black points. Use */
/*    the eight work variables to acquire and OR result */
/*    for each bit. Then, perform and AND operation for */
/*    each bit by using the results and the resultant */
/*    work variables, and substitute the AND results */
/*    into the resultant work variables. */
        wk3 &=( ul| up| ur| cl| cr| dl| dw| dr );
        wk3 &=( ul| up| ur| cl| cr| dl| dw| dr );
        wk3 &=( ul| up| ur| cl| cr| dl| dw| dr );
        wk3 &=( ul| up| ur| cl| cr| dl| dw| dr );
/* 9. Substitute the resultant work variables into */
/*    an original work array pattern. */
        *(buf16x24 + I-1) = wk3;
}
} /* End of Smooth24( ) */
```

Smoothing by the deletion of individual protruding and extraneous dots is performed by deleting one dot in the center when a pattern that is three bits wide and two bits high or that is two bits wide and three bits high matches one of the four following patterns, E, F, G or H.

TABLE 2

| E | | | | | | F | | | |
|---|---|---|---|---|---|---|---|---|---|
| . | . | . | . | . | . | . | . | . | . |
| * | . | → | . | . | . | * | . | → | . |
| . | . | . | . | . | . | . | . | . | . |
| | | G | | | | | | H | |
| . | . | . | . | . | . | . | . | . | . |
| . | * | → | . | . | . | * | . | → | . |
| . | . | . | . | . | . | . | . | . | . | an asterisk indicates a black point (= 1)
a period indicates a blank point (= 0)

Figure 8:
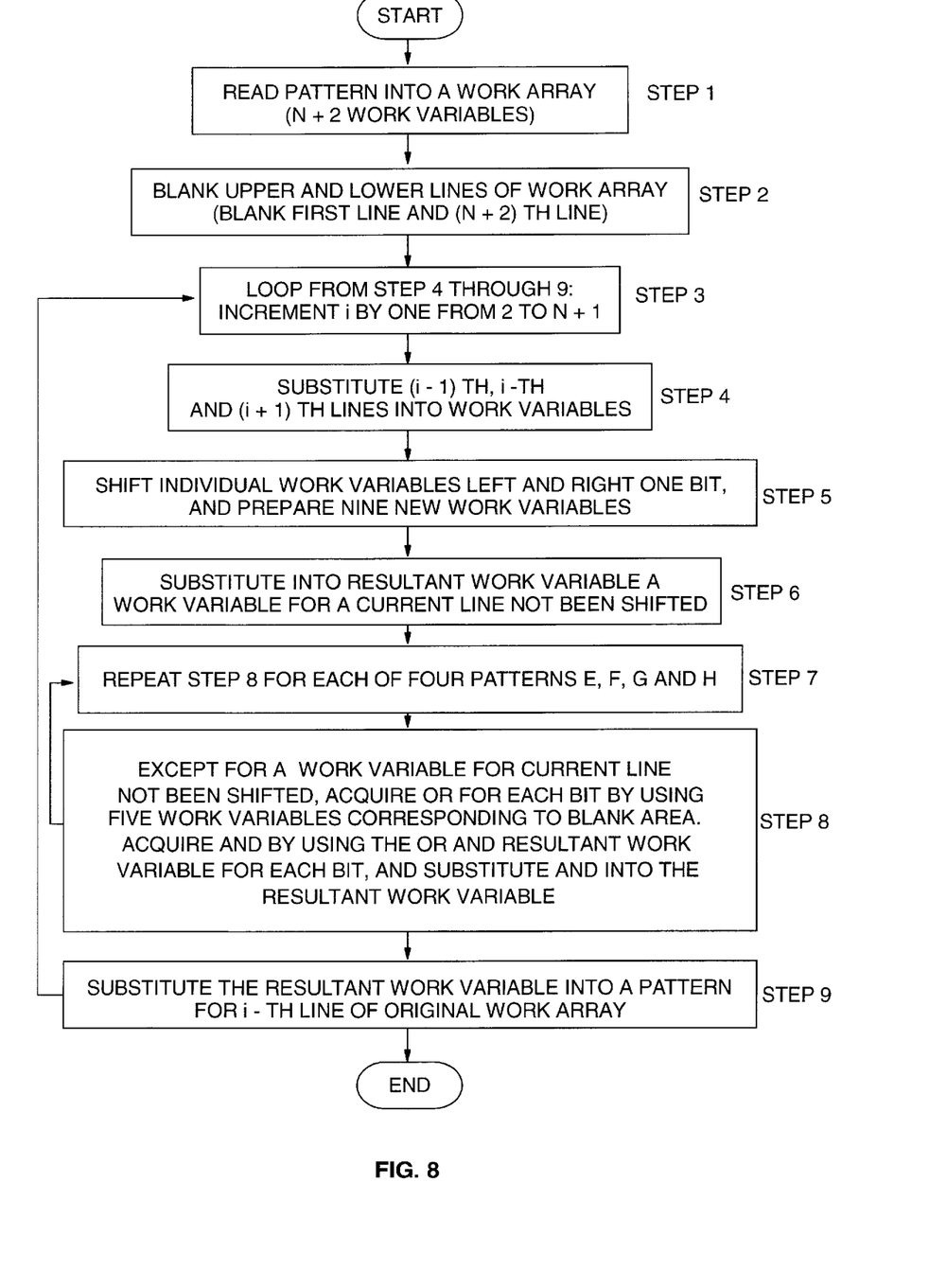
FIG. 8 is a flowchart showing a smoothing process performed by the deletion of individual protruding and extraneous dots.

The smoothing process by the deletion of individual protruding and extraneous dots is performed basically in the same manner as for the smoothing process for corners. FIG. 8 is a flowchart of the smoothing process performed by the deletion of individual protruding and extraneous dots. At step 1, a bit pattern is read into a work array. When the total number of lines in the bit pattern are defined as n, the work array contains n+2 lines, as it has two extra lines at the top and at the bottom. Therefore, the bit pattern is read and stored into the second line of the work array. At step 2, the line at the top and at the bottom are blanked out. At step 3, a loop variable I is incremented by one from 2 to n+1 in order for the processing at step 4 through step 9 to be repeated.

At step 4, the line (l-1), which precedes the l-th line of the work array, the current line (l) and the succeeding line (l+1) are substituted into the work variables. At step 5, the work variables are shifted one bit to the right and to the left and are substituted into different work variables. Therefore, nine work variables are provided. At step 6, work variable for the current line not shifted is substituted into the resultant work variable. The processes at steps 7 and 8 are slightly different from those in the smoothing process for corners.

At step 7, the following process at step 8 is repeated for each pattern, E, F, G or H. At step 8, except for the work variable of the current line that is not shifted, five work variables that correspond to the locations of blanks are employed to acquire a total OR result for each bit. An AND operation is performed for each bit of the OR result and the above described resultant work variable (current line without shift), and the results are substituted into the resultant work variable.

Finally, at step 9, the obtained final work variable is substituted into the pattern of the l-th line in the work array. The process for smoothing by the deletion of the individual protruding and extraneous dots is thereafter terminated.

A specific example that is written in C and is based on the flowchart in FIG. 8 will now be given for reference.

```
void DeleteNoise 24(
unsigned short *buf16x24 /* pointer to a pattern to be
smoothed */) {
static unsigned short wkbuf[26]; /* work array */
short       I;
unsigned short ct;    /* center work variable 1 */
unsigned short cl;    /* c. left work variable 2 */
unsigned short cr;    /* c. right work variable 3 */
unsigned short up;    /* up     work variable 4 */
unsigned short ul;    /* u. left work variable 5 */
unsigned short ur;    /* u. right work variable 6 */
unsigned short dw;    /* down   work variable 7 */
unsigned short dl;    /* d. left work variable 8 */
unsigned short dr;    /* d. right work variable 9 */
unsigned short wk3;   /* resultant work variable */
/* 1. Shift a w-bit wide n-bit high pattern one line */
/*    and copy it to a work array (w (n+2) lines). */
for (I = 1; I < 25 ; I ++) {
        wkbuf[i] = *(buf16x24 + I-1);
}
/* 2. Blank out the top and bottom lines */
/*    of a pattern in a work array */
wkbuf[0] = 0;
wkbuf[25] = 0;
/* 3. Loop through steps 4-9 from second line */
/*    to the n+1-th line */
for (I = 1; I < 25; I ++) {
        /* 4. Substitute (I-1)th, I-th, and (I+1)th lines */
        /*    in the work array into work variables. */
        ct = wkbuf[i];
        up = wkbuf[i-1];
        dw = wkbuf[i+1];
/* 5. Shift work variables to the right and to the left */
/*    one bit and substitute them into different work */
/*    variables. Produce nine work variables. */
```

```
                cl = ct >> 1;
                cr = ct << 1;
                ul = up >> 1;
                ur = up << 1;
                dl = dw >> 1;
                dr = dw << 1;
        /* 6. Subsitute work variables for a current line */
        /*    not shifted into resultant work variables. */
                wk3 = ct;
        /* 7. Repeat 8 for each of four patterns. */
        /* 8. Except for the work variables of the current line */
        /*    not shifted, use five work variables that */
        /*    correspond to the locations of blank dots to */
        /*    acquire an OR result for each bit. Then, perform */
        /*    an AND operation for each bit by using the */
        /*    results and the resultant work variables, and */
        /*    subsitute the AND results into the resultant */
        /*    work variables. */
                wk3 &=( cl| cr| ul| up| ur );
                wk3 &=( cl| cr| dl| dw| dr );
                wk3 &=( up| dw| ul| cl| dl );
                wk3 &=( up| dw| ur| cr| dr );
        /* 9. Substitute the resultant work variables into */
        /*    an original work array pattern w n */
        /*    (w bits  n lines). */
                *(buf16x24 + I-1) = wk3;
        }
    }       /* End of DeleteNoise( ) */
```

Figure 9:
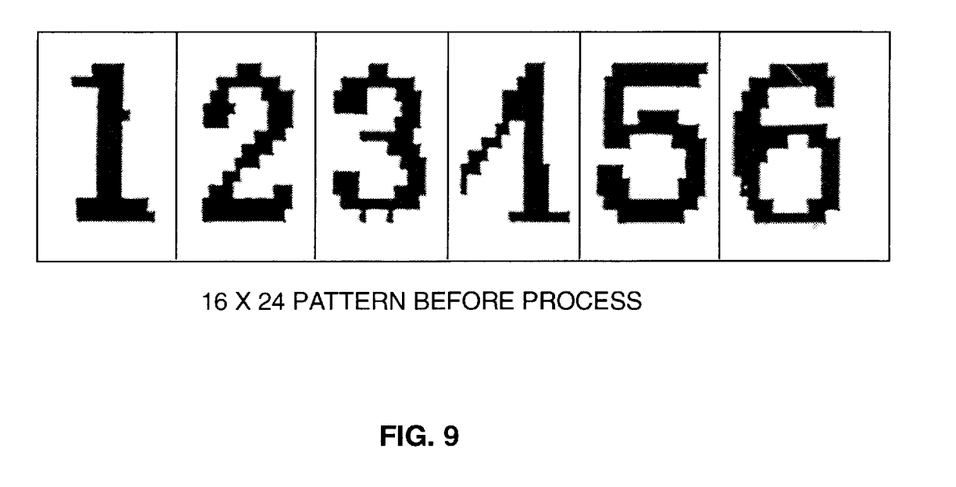
FIG. 9 is a diagram showing a bit pattern before the smoothing process for big corners is performed.
Figure 10:
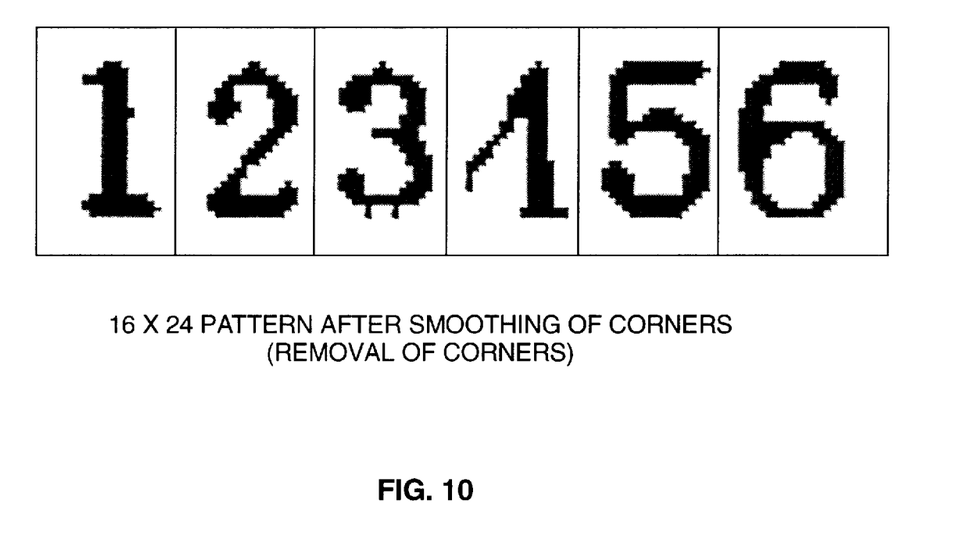
FIG. 10 is a diagram showing a bit pattern after the smoothing process for big corners is performed.
Figure 11:
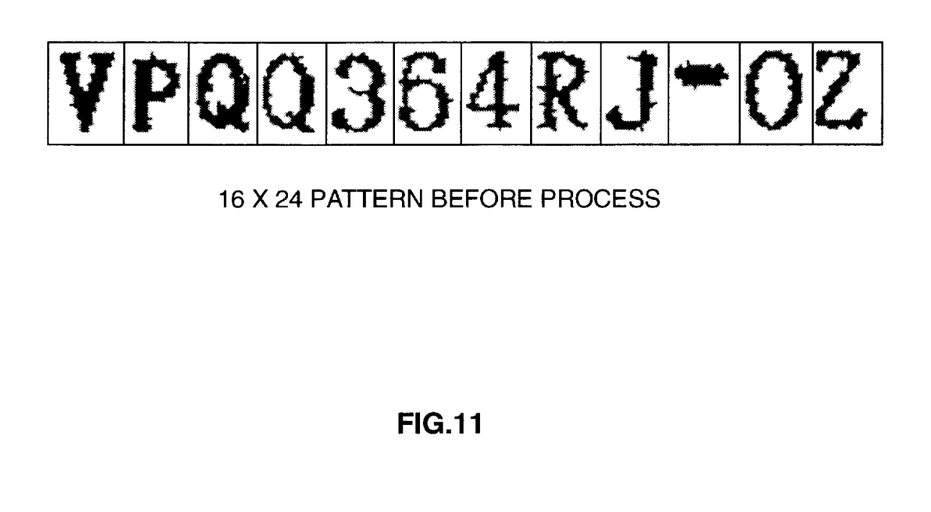
FIG. 11 is a diagram showing a bit pattern before the smoothing process performed by the deletion of individual protruding and extraneous dots is employed.
Figure 12:
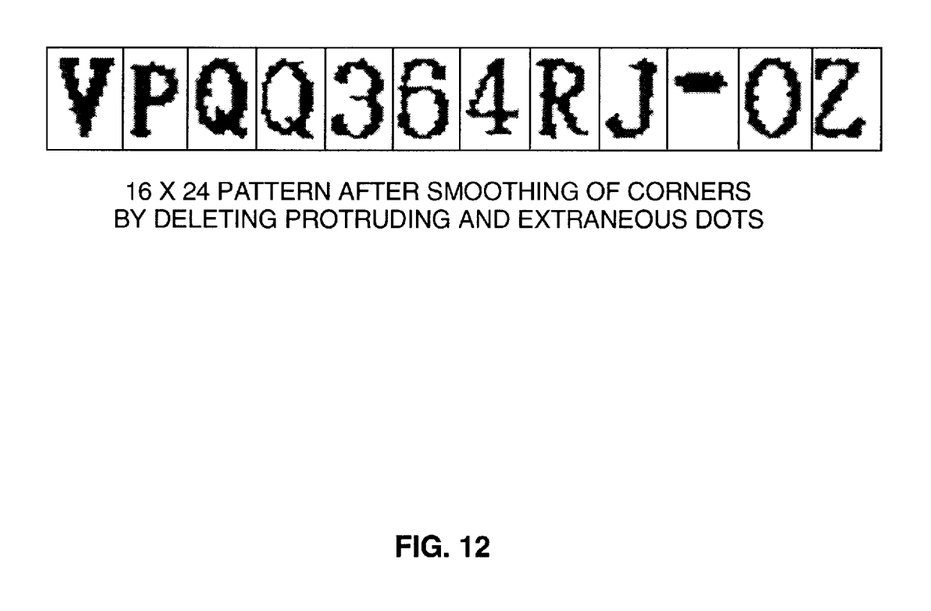
FIG. 12 is a diagram showing a bit pattern after the smoothing process performed by the deletion of individual protruding and extraneous dots is employed.

In FIGS. 9 through 12 are shown bit patterns before the smoothing processes (1) and (2) are performed, and bit patterns after the smoothing processes (1) and (2) have been performed, respectively. Large corners in FIG. 9 are deleted as shown in FIG. 10 at a processing speed that can almost be disregarded. Noisy points in FIG. 11 are deleted, as is shown in FIG. 12.

Although, in the above embodiment, a line having an eight bit length is employed as the unit for processing, the line can be expanded to 16/32/64 bits for the employment of the method. Further, since a different smoothing process can be used by merely varying the black point portions and blank portions in a mask pattern set, the method of the present invention is very flexible. Thus, this method can be applied for the enhancement of other images by changing the pattern.

According to the present invention, a smoothing process for a figure (a normalized pattern for an OCR process) drawn as a bit pattern can be performed at high speed, and the speed for the OCR software processing can be increased to a practical use level. In addition, since the quality obtained by the smoothing process is equivalent to that acquired by using hardware, there is no reduction in the recognition rate.

In the drawings and specifications there has been set forth a preferred embodiment of the invention and, although specific terms are used, the description thus given uses terminology in a generic and descriptive sense only and not for purposes of limitation.

What is claimed is:

1. A method for smoothing an outline of a figure in a bit pattern that has a w bit width and an n bit height comprising the steps of:

storing a bit pattern as n line variables of w bits per line; and performing a smoothing operation for said n line variables employing only the logical operators BIT SHIFT, NOT, OR, and AND;

wherein said step of performing a smoothing operation includes a shift operation step in which one selected line of said n line variables is regarded as a current line; wherein three line variables for said current line, a line preceding said current line and a line succeeding said current line are prepared; and wherein bits of said current line, said preceding line and said succeeding line are shifted to the left and right to obtain nine line variables.

2. The method according to claim 1, further comprising a logical operation step of acquiring NOT, OR and AND operation results for said nine line variables prepared at said shift operation step.

3. The method according to claim 2, wherein said logical operation step includes a smoothing operation for deleting corners.

4. The method according to claim 2, wherein said logical operation step has a smoothing operation for deleting individual protruding and extraneous dots.

5. A computer system comprising:

a processor;

memory operatively associated with and accessible to said processor, said memory storing an outline of a figure in a bit pattern, the bit pattern being stored as n line variables of w bits per line; and a smoothing program stored in said memory and executable on said processor to perform a smoothing operation for said n line variables by employing only the logical operators BIT SHIFT, NOT, OR, and AND;

wherein said smoothing program includes shift operation instructions wherein one selected line of said n line variables is regarded as a current line; wherein three line variables for said current line, a line preceding said current line and a line succeeding said current line are prepared; and wherein bits of said current line, said preceding line and said succeeding line are shifted to the left and right to obtain nine line variables.

6. The computer system according to claim 5, wherein said smoothing program further comprises logical operation instructions for acquiring NOT, OR and AND operation results for said nine line variables prepared at said shift operation step.

7. The computer system according to claim 6, wherein said logical operation instructions perform a smoothing operation for deleting corners.

8. The computer system according to claim 6, wherein said logical operation instructions perform a smoothing operation for deleting individual protruding and extraneous dots.

* * * * *